Sept. 30, 1947.  T. HORN  2,428,080
CAB METER
Filed Aug. 23, 1945  5 Sheets-Sheet 1

INVENTOR.
Thurman Horn
BY
ATTORNEY

INVENTOR.
Thurman Horn
BY
ATTORNEY

INVENTOR.
Thurman Horn
BY
ATTORNEY

Sept. 30, 1947 T. HORN 2,428,080
CAB METER
Filed Aug. 23, 1945 5 Sheets—Sheet 5

INVENTOR.
Thurman Horn
BY
ATTORNEY

Patented Sept. 30, 1947

2,428,080

UNITED STATES PATENT OFFICE 2,428,080

CAB METER

Thurman Horn, Anniston, Ala., assignor to Cabometer, Inc., a corporation of Alabama Application August 23, 1945, Serial No. 612,261

11 Claims. (Cl. 235—30)

This invention relates to meters of the type installed in taxicabs for registering the fares, number of trips made, and other information, and has for an object the provision of apparatus of the character designated which shall be characterized by simplicity of construction, involving few parts which may be readily assembled and disassembled, without the necessity of special tools, and which may be readily mounted on, and connected with, the usual odometer drive of a motor vehicle.

A further object of my invention is to provide a meter of the character designated which shall include a main actuating cam which shall be easily adaptable to any basic fare structure.

A still further object of my invention is to provide a meter of the character designated which shall be rugged and simple of construction, accurate in operation, and of relatively low cost of manufacture.

Briefly, my invention comprises a multilobed cam, driven from the usual odometer drive on the vehicle through a suitable gear train, which cam through suitable connections, drives the fare registering mechanism. The cam is mounted on a shaft in bearings on a carrier frame which is adapted to raise it out of engagement with the drive and lower it into engagement with the drive by a cam mounted on the flag shaft of the meter. Mechanism for registering the number of trips made is actuated by the carrier frame each time the flag shaft is operated. A unique feature of my invention resides in means to rotate the main actuating cam shaft to a predetermined starting position each time the flag shaft is operated, together with means to move the actuating pawl for the fare registering mechanism to a predetermined starting position each time the flag shaft is operated. Also, included in my improved meter are means actuated from the main operating cam to register the number of fare units accumulated by the vehicle and also the number of revenue miles run. There is further included in the mechanism, means for returning the fare registering mechanism to a predetermined initial position each time the flag shaft is operated.

Apparatus embodying features of my invention is illustrated in the accompanying drawings, forming a part of this application, in which Fig. 1 is a diagrammatic, perspective view showing the various parts in their operating relationship;

Figure 1:
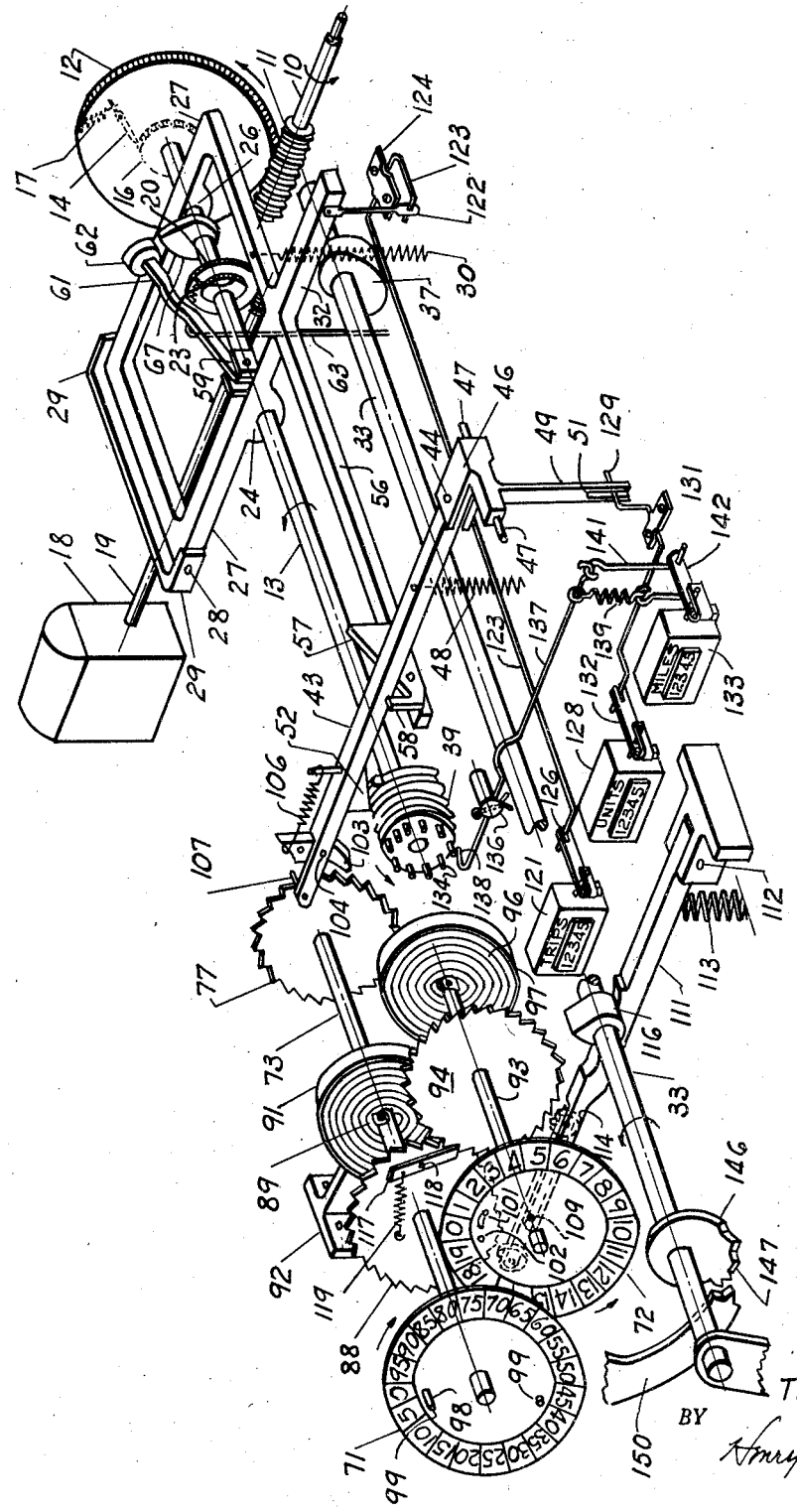

Referring to the drawing, my improved meter is mounted in a casing having sides 5 and 6, in a rear wall 7 and an inner front wall 8. An outer front wall 9, spaced from the wall 8 forms a narrow housing for the dials of the fare registering mechanism, and for a shutter adapted to cover said dials at times, all to be described later. The casing thus described is adapted to have mounted thereon top and bottom covers which are not shown. The casing as shown is especially adapted for mounting in the glove compartment of a motor vehicle.

At 10, I show a worm shaft which is adapted for connection to the usual odometer, or speedometer drive of a vehicle. A worm 11 mounted on the shaft 10 is adapted to engage with a worm wheel 12, and is mounted free to rotate on a main cam shaft 13. A pawl 14 on the wheel 12 is held in engagement with a ratchet wheel 16 mounted on the shaft 13. A spring 17 holds the pawl 14 in engaged position, as shown in Fig. 1, so that the worm wheel 12 will drive the shaft 13 in a counter clockwise direction, as indicated, but the shaft 13 may be driven by other means such as by the chronometric apparatus 18, drive shaft 19, worm wheel 20, worm 21, pawl 22, and ratchet wheel 23. The purpose of this latter drive is to assume the driving of the meter in slow traffic, or during waiting time.

The main cam shaft 13 is mounted in bearings 24 and 26 on a carrier frame 27. The frame 27 is pivotally mounted at 28 in a bracket 29 secured to the side 6 of the casing. A spring 30 serves to bias the frame downwardly. The carrier frame 27 is somewhat rectangular in shape, as may be seen from Figs. 1, 4 and 5 of the drawings, and includes an arm member 32 projecting across the casing. At 33 is shown the meter flag shaft which extends through the meter casing, being mounted in bearings 34 and 36. A cam 37, mounted on the flag shaft 33, is adapted to engage the arm 32 of the carrier frame and raise the carrier frame with the worm wheels 12 and 20 to disengage them from the worms 11 and 21, each time the flag shaft is rotated to raise the customary flag shown at 38.

Figure 6:
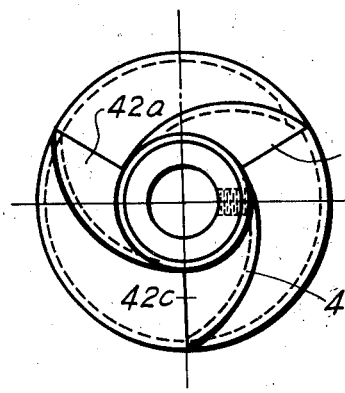
Figs. 6 and 7 are detail front and side views respectively of the mutilobed cam.
Figure 7:
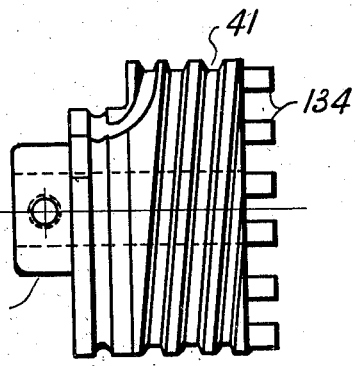
Figure 8:
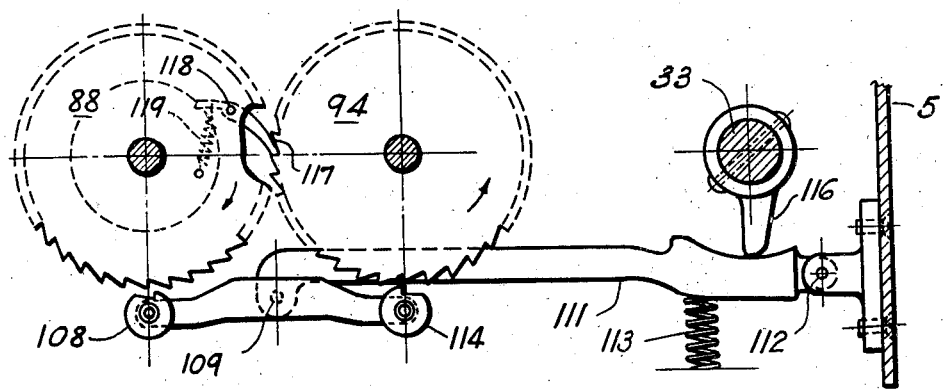
Fig. 8 is a detail view of the stop pawl arm and pawls.
Figure 9:
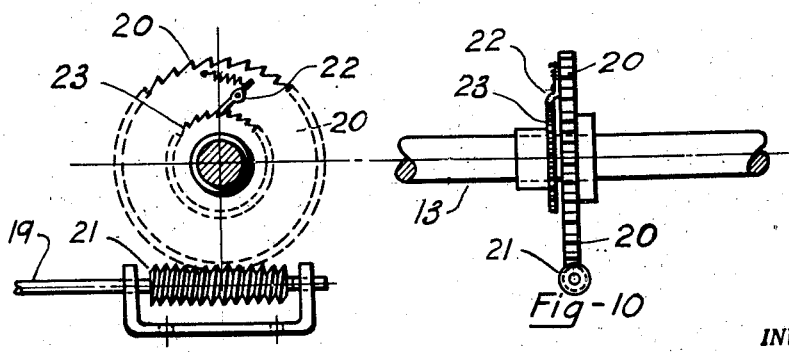
Figs. 9 and 10 are detail views showing the cam shaft drive connection from the chronometric device.
Figure 10:
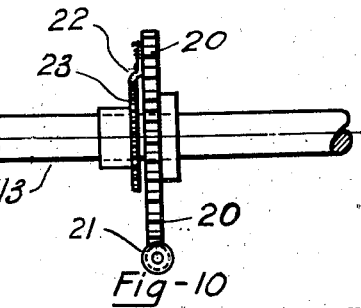

Mounted on the end of the main cam shaft 13 opposite the gear 12 is a cylindrical member 39 having a spiral groove 41 around the periphery thereof, which groove terminates in a multilobe cam member 42. See Figs. 6 and 7. As shown in Fig. 6, the cam member is provided with three lobes 42a, 42b and 42c to adapt the meter for registering each third of a mile, it being assumed that the basis of charge is by the third of a mile.

Extending across the casing, over the drive shaft 13 is a ratchet arm 43 the function of which is to actuate the fare registering mechanism, to be described later. The ratchet arm 43 is pivotally mounted to swing in a horizontal plane at 44 in a bracket 46, which is pivotally mounted to swing in a vertical plane at 47. The arm 43 is thus adapted to swing both in a horizontal and in a vertical plane. It is biased downwardly by means of a spring 48. The bracket 46 upon which the arm 43 is mounted is provided with a depending arm 49 having a slotted end 51, which arm is adapted to operate the fare unit registering mechanism to be described later. The ratchet arm 43 carries a blade 52 on its under side which is adapted to ride on the cylindrical member 39 when in engagement therewith and be actuated by the multilobe cam member 42 which forms a part of the cylindrical member 39. The pivoted ratchet arm 43 extends across the casing and over an arm 56 forming a part of the carrier frame 27. The arm 56 has mounted thereon an inclined cam plate 57 which is directly under the ratchet arm 43. It will be noted from Figs. 1 and 4 that the ratchet arm 43 is pivoted on side 5 of the casing opposite the pivot of the carrier frame 27 so that when the carrier frame is raised by the cam 37, the inclined cam plate 57 engages the ratchet arm and raises it up out of engagement with the cylindrical member 39. When this occurs, the spring 48, coacting with the inclined surface of the cam plate 57 causes the ratchet arm to move laterally to a position limited by a stop member 58 carried by the cam plate 57. Thus, each time the carrier frame is raised, the ratchet arm 43 is returned to a predetermined starting position, in which position the blade 52 is engaged in the outer end of the spiral groove 41.

Figure 3:
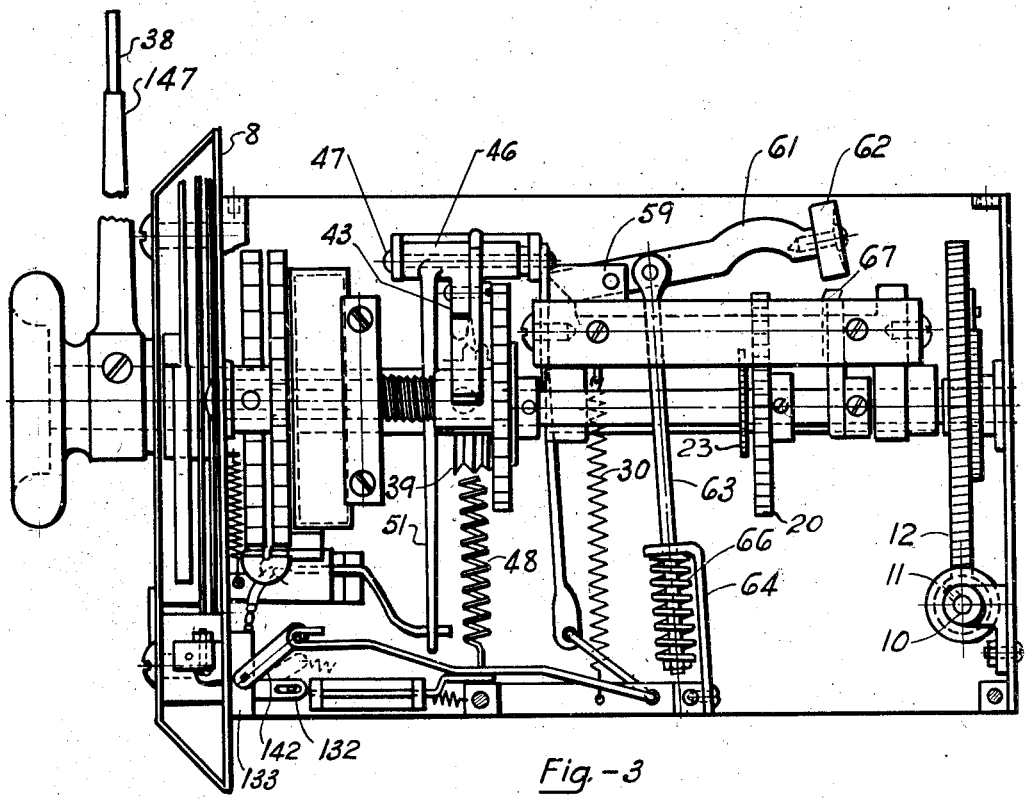
Fig. 3 is a side view of the mechanism, with the side of the casing removed.

Pivotally mounted at 59 on the carrier frame 27 is a roller arm 61 carrying a roller 62. The arm 61 is connected, adjacent its pivot point, to a link 63 extending downwardly to the bottom of the casing where it is connected to a bracket 64 by means of a spring connection 66. See Fig. 3. At 67 is shown a cam, mounted on the drive shaft 13, directly under the roller 62, so that when the carrier frame 27 is raised, raising the gear 12 out of engagement with the worm 11, the cam 67 engages the roller 62 and the roller rotates the drive shaft 13 to a predetermined starting position in which the outer end of the spiral groove 41 on the cylindrical member 39 is directly beneath the blade 52 on the ratchet arm 43.

The fare registering mechanism comprises a dial 71 upon which the fractions of a dollar are registered and a dial 72 upon which the dollars are registered. The dial 71 is mounted on a shaft 73 which is suitably mounted in bearings 74 and 76 inside the casing. The shaft 73 has mounted thereon an actuating ratchet 77 and a holding ratchet 88. A return spring 89 has one end secured to the shaft 73 and the other end frictionally engaged with a drum 91 secured to a bracket 92, mounted on the side of the casing. The dollar indicating dial 72 is mounted on a shaft 93 extending parallel to the shaft 73 and which carries an actuating and holding ratchet 94. A return spring 96 has one end secured to the shaft 93 and its other end frictionally engaged with a drum 97, also carried by the bracket 92. The shaft 93 is adapted to rotate in a direction opposite to the shaft 73 and accordingly the spring 96 is wound in a direction opposite to that of the spring 89. At 98 I show a stop member which is pivotally mounted on the casing and which is adapted to engage a stop pin 99 on the dial 71 when the shaft 73 is released for return movement. The pin 99, as is well understood, is usually positioned so that the dial 71 will show an initial fare. At 101 I show a similar stop member, which is pivotally mounted on the casing and which is adapted to engage with the stop pin 102 when the dial 72 and its shaft 93 are released for return movement. The initial position of the dial 72, as is well understood, is usually at zero. Both the stop members 98 and 101 permit the stop pins 99 and 102 to pass when the dials are rotating in a direction to register a fare, but are adapted to engage the stop pins when the shafts are released to be returned by their springs 89 and 96.

The fare registering mechanism just described is actuated from the ratchet arm 43 by means of a pawl 103 pivotally mounted at 104 on the ratchet arm and biased for engagement with the actuating ratchet wheel 77 by means of a spring 106. A pin 107 on the outer end of the ratchet arm 43 is so positioned that the ratchet arm can move the actuating ratchet wheel 77 only one notch at a time. When the carrier frame 27 is raised by rotation of the flag shaft 33, as previously described, the ratchet arm 43 is moved laterally by the cam plate 57 to a position where the pawl 103 is out of engagement with the ratchet wheel 77. As the shaft 13 rotates, with the cylindrical member 39, the blade 52, riding in the spiral groove 41, moves the ratchet arm 43 laterally to a position where the pawl 106 is in position to engage the teeth of the ratchet wheel 77. Thus, the fare registering mechanism is not actuated until the vehicle has gone a predetermined minimum distance determined by the length of the groove 41. The minimum fare indicated on the dial 71 compensates for this distance. When the blade 52 rides out of the groove 41, then each time it drops off one of the lobes 43a, 43b and 43c, the spring 48 pulls the ratchet arm 43 downwardly so that the pawl 103 actuates the ratchet wheel 77 one notch. Assuming the fare base to be a third of a mile, the ratchet wheel 77 will move the fractional dial 71 one notch each ⅓ of a mile thus indicating the accumulated fare. The shaft 73 is held against return movement, by means of the holding ratchet wheel 88 which is engaged by a pawl 108 pivotally mounted at 109 upon an arm 111 which is pivotally mounted at 112 on the side 5 of the casing and is biased upwardly by means of a spring 113. The pawl 108 also has one finger 114 which engages with the teeth of the actuating ratchet wheel 94 of the dollar registering dial 72 to hold it against return movement. The pawls 108 and 114 are moved out of engagement with the ratchet wheels 88 and 94 by means of a cam 116 mounted on the flag shaft 33 which cam is rotated to disengage the pawls each time the flag 38 is raised.

The dollar registering dial 72 is actuated one step each time the fractional dial holding ratchet 88 is rotated one complete revolution. This is accomplished by means of a pawl 117 pivotally mounted at 118 on the ratchet wheel 88. This pawl is held in engagement with the ratchet wheel 94 by means of a spring 119 which permits the teeth on the ratchet wheel 94 to pass when the holding pawl 114 is disengaged and the spring 96 is rotating the dial 72 in a counter clockwise direction, as viewed in Fig. 1, to its initial starting position.

At 121 I show a cyclometer of well known construction and which requires no detailed description, which cyclometer is adapted to register the number of revenue trips made by the cab, responsive to the number of actuations of the flag shaft 33. The cyclometer 121 is actuated by means of a link 122 connected to the arm 32 of the carrier frame 27 at one end and at the other end to a bell crank lever 123 pivotally mounted at 124 in the casing. The bell crank lever 122 is connected at its other end to the operating arm 126 of the cyclometer 121. As previously described, the cam 37 raises the carrier frame 27 each time the flag 38 is raised, and lowers it each time the flag 38 is lowered. By this means, the actuating arm 126 causes the cyclometer 121 to register each time the flag is raised and lowered to indicate the completion of a trip.

At 128 I show a cyclometer, similar to the cyclometer 121 which is adapted to register the number of fare units recorded on the tire registering mechanism responsive to actuation by the lobes 42a, 42b and 42c of the cam member 42. This is accomplished by means of the depending arm 49 of the bracket member 46. The slotted end 51 of this arm has mounted therein one end 129 of a bell crank lever which is pivotally mounted at 131 in the casing. The other end of the bell crank lever 129 is connected to the operating arm 132 of the cyclometer 128. By this means, each time the ratchet arm 43 is raised and lowered by the lobes 42a, 42b and 42c, the cyclometer 128 is operated.

At 133 I show a cyclometer, similar to the cyclometers 121 and 128, which is adapted to register the revenue miles made by the vehicle. In order to accomplish this function, I show on the cylindrical member 39 a plurality of axially extending pins 134. Inasmuch as the main cam shaft 13 is assumed to rotate one complete revolution for each mile of operation, it is preferable to have ten of the pins 134. Pivotally mounted at 136 is a rod 137 having an upturned end 138 adapted to be engaged by the pins 134 and cause the rod to oscillate about its pivot point. The other end of the rod 137 is biased downwardly by means of a spring 139 and is connected by means of a link 141 to the operating arm 142 of the cyclometer 133. The cyclometer 133 thus registers each tenth of a mile traveled by the vehicle when the meter is in operation.

Figure 4:
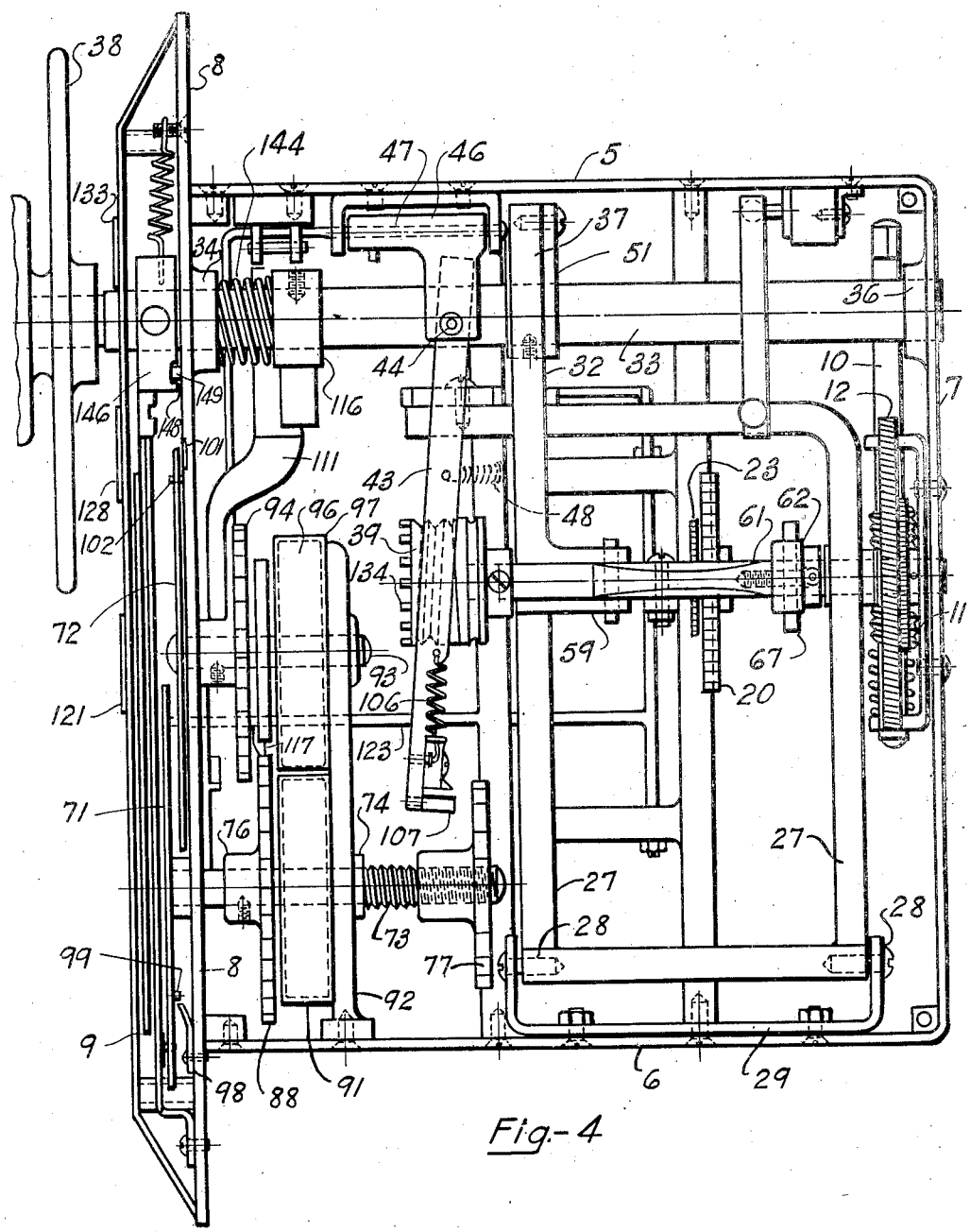
Fig. 4 is a top plan view.
Figure 5:
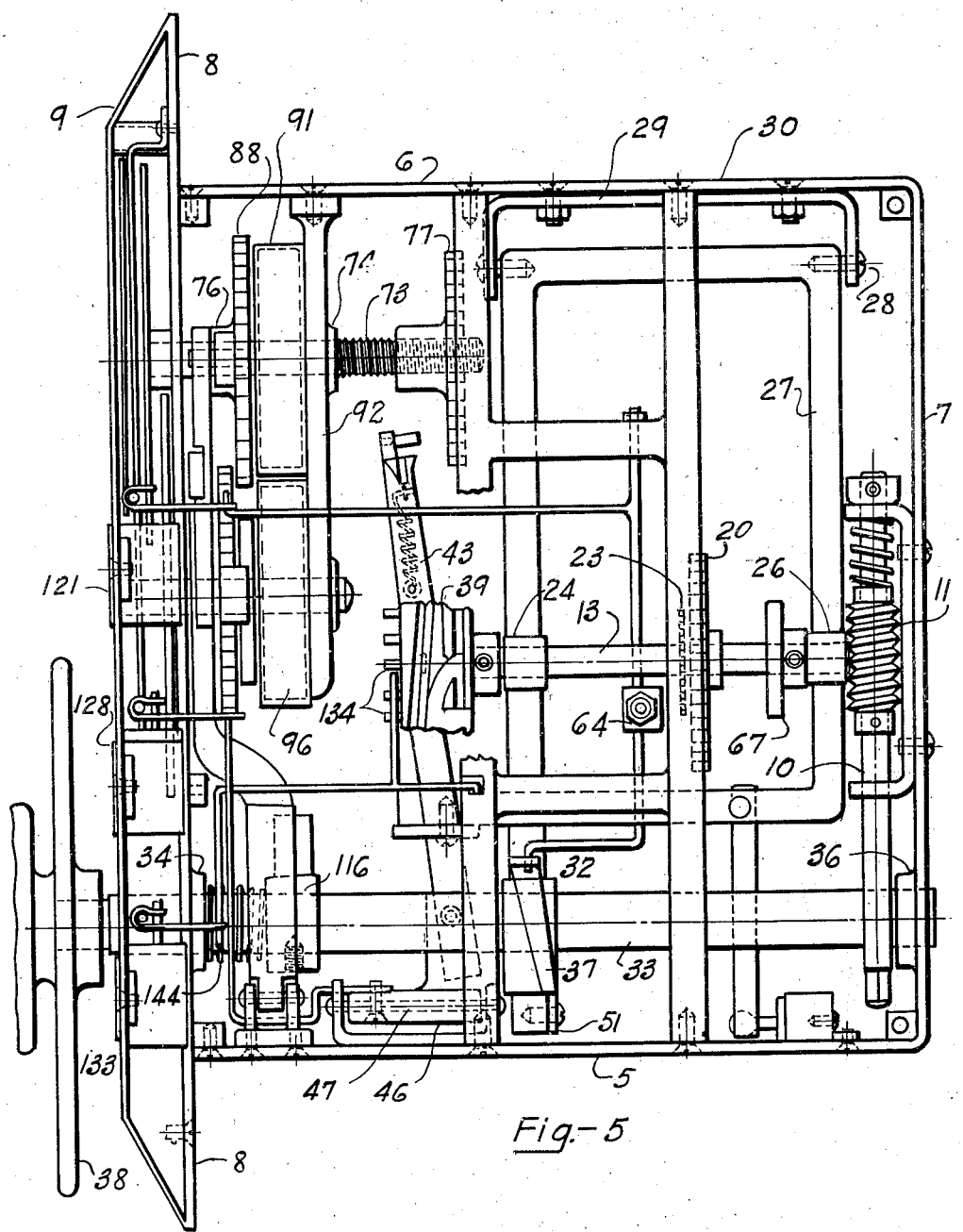
Fig. 5 is a bottom plan view.

As shown in Figs. 4 and 5, I provide a spring 144 on the flag shaft 33 which engages with the side of the cam 116 at one end and with the bearing 34 at the other end. At 146 I show a cam mounted on the shaft 33 which cam is provided with notches 147. I also provide lateral notches 148 in the side of the cam which are adapted to engage with teeth 149 on the end of the casing which teeth make it necessary, in order to rotate the shaft 33, to pull the shaft outwardly and disengage the teeth. This precaution discourages tampering with the meter. The notches 147 on the cam 146 are adapted to be engaged by a pawl 150 pivotally mounted at 151 and carrying on its opposite end a shutter 153. The pawl 150 engaging with the teeth 147 prevents rotation of the flag shaft 33 except in a clockwise direction, as viewed in Fig. 2. The shutter 153 is adapted to be raised by the cam 146 when the flag is in the raised position with the cab awaiting a fare. When a revenue trip starts, the shaft is rotated so as to place the flag in the down position, as shown in Fig. 1, whereupon the pawl 149 rides off the cam 146, and a spring 154 pulls the pawl 150 upwardly, thereby lowering the shutter 153 and disclosing the dials of the fare registering mechanism.

Figure 2:
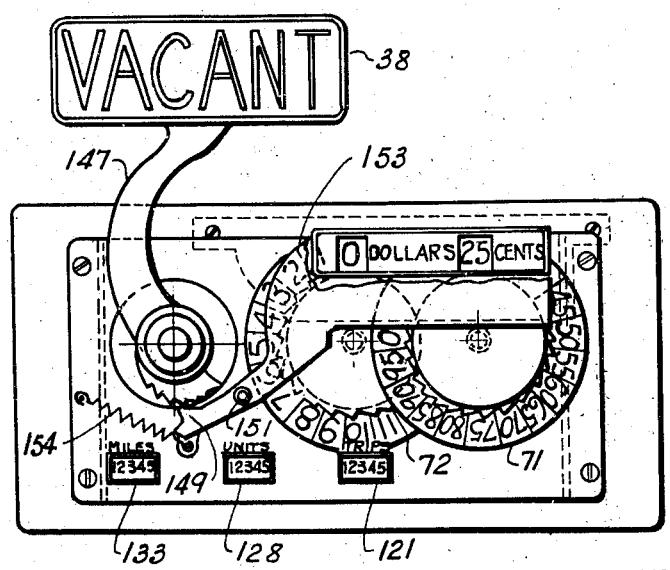
Fig. 2 is a front view of the meter, with the outer front wall removed and with the shutter broken away.

From the foregoing description, the operation of my improved apparatus will be readily understood. Assuming the cab idle, awaiting a fare, the flag 38 is in raised position, as shown in Fig. 2. When a revenue trip begins, the operator turns the flag 38 to the down position, as shown in Fig. 1, whereupon the cam 37 is turned downwardly and the spring 30 pulls the carrier frame 27 downwardly to engage the gear wheel 12 with the worm 10, thereupon placing the registering mechanism in operation. This action lowers the shutter 153 disclosing the minimum fare. As the gear 12 is rotated by the worm 11, it rotates the cylindrical member 39 with its multilobe cam, thus actuating the ratchet arm 43 each time the blade 52 drops off one of the lobes of the cam. The ratchet arm 43 actuates the fare registering mechanism as previously described, step by step to indicate the fare, which indication is visible to the operator and passenger through the end of the casing as shown in Fig. 2. When the flag 38 was lowered, it actuated the trip cyclometer 121, thus registering a revenue trip for the cab. Each time the blade 52 rides off one of the lobes 42a, 42b and 42c of the cylindrical member 39, the arm 49, through the bell crank lever 129 actuates the unit cyclometer 128, thus showing the total number of fare units made by the cab. At the same time, the axially extending pins 134 engaging with the end 138 of the rod 137 cause it to actuate the mileage indicating cyclometer 133 through the link 141 and the arm 142. When the revenue trip is ended, the flag 38 is raised to the position shown in Fig. 2, whereupon the cam 116 disengages the pawls 108 and 114 from the ratchets 88 and 94, permitting the springs 89 and 96 to return the fare registering dials to their original positions. The rotation of the flag shaft 33 also raises the carrier frame 27 and raises the gear 12 out of engagement with the worm 11. At the same time, the roller 62 engages the cam 67 and rotates the drive shaft 13 to a predetermined starting position for the next revenue trip. Also, when this occurs, the cam plate 57 on the arm 56 of the carrier frame 27 engages the ratchet arm 43 and moves it to the right, as viewed in Fig. 1, so that the blade 52 is ready to engage in the outer end of the spiral groove 41 in the cylindrical member 39, which is the starting position for a revenue trip. It will be seen also that when the carrier frame 27 is raised the cylindrical member 39 is raised with the pins 134 out of engagement with the trip member 137. The mileage indicator thus operates only when the fare registering mechanism operates. When the flag 38 is again lowered, the cycle of operation just described begins again.

From the foregoing, it will be apparent that I have devised a cab meter which is simple and rugged of construction, and reliable in operation. It may be assembled in a minimum of time with simple tools and does not require expert attention in order to keep it in working order. Being simple of construction, and having so few parts, its initial cost is low, as well as its maintenance cost.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a cab meter, fare registering mechanism, a ratchet wheel by which the registering mechanism is actuated, an arm pivoted to swing vertically and from side to side and having a pawl thereon adapted to engage and operate the ratchet wheel step by step, a cam member having a cylindrical portion with a spiral groove therein terminating in a plurality of lobes disposed beneath the pivoted arm, a blade on the pivoted arm adapted to engage in the spiral groove and to raise and lower the arm responsive to engagement with the lobes of the cam, a manually operable shaft, and cam means on said shaft operatively connected to the pivoted arm to engage it with and disengage it from the multiple lobed cam.

2. In a cab meter, fare registering mechanism, a ratchet wheel by which the registering mechanism is actuated, an arm pivoted to swing vertically and from side to side and having a pawl thereon adapted to engage and operate the ratchet wheel step by step, a cam member having a cylindrical portion with a spiral groove therein terminating in a plurality of lobes disposed beneath the pivoted arm, a blade on the pivoted arm adapted to engage in the spiral groove and to raise and lower the arm responsive to engagement with the lobes of the cam, a cam shaft, a pivoted frame on which said shaft is mounted and having an arm disposed beneath the pivoted arm, driving means for the cam shaft, a manually operable shaft, cam means on said shaft disposed to engage the pivoted frame to raise and lower it to disengage the cam shaft from its driving means and engage it therewith and other cam means on the frame for engaging the pivoted arm to raise and lower it with its pawl and out of engagement with the ratchet and to move it laterally for its blade to engage in the outer end of the spiral groove.

3. In a cab meter, fare registering mechanism, a ratchet wheel by which the registering mechanism is actuated, an arm pivoted to swing vertically and from side to side and having a pawl thereon adapted to engage and operate the ratchet wheel step by step, a cam member having a cylindrical portion with a spiral groove therein terminating in a plurality of lobes disposed beneath the pivoted arm, a blade on the pivoted arm adapted to engage in the spiral groove and to raise and lower the arm responsive to engagement with the lobes of the cam, a cam shaft, a pivoted frame on which said shaft is mounted and having an arm disposed beneath the pivoted arm, driving means for the cam shaft, a manually operable shaft, cam means on said shaft disposed to engage the pivoted frame to raise and lower it to disengage the cam shaft from its driving means and engage it therewith, other cam means on the frame for engaging the pivoted arm to raise and lower it with its pawl into and out of engagement with the ratchet and to move it laterally for its blade to engage in the outer end of the spiral groove, and means operable responsive to raising the pivoted frame to rotate the cam shaft to a predetermined position.

4. In a taxicab meter, fare registering mechanism, a cam for actuating the fare registering mechanism intermittently, a cam shaft, a driven gear mounted on the cam shaft, a driving gear adapted to mesh with the driven gear and drive it responsive to movements of the vehicle, a pivoted frame upon which the cam shaft is mounted, means to move the frame about its pivot to engage and disengage the driving and the driven gears and to establish and disestablish an operative connection between the cam and the fare registering mechanism.

5. In a taxicab meter, fare registering mechanism, a cam for actuating the fare registering mechanism intermittently, a cam shaft, a driven gear mounted on the cam shaft, a driving gear adapted to mesh with the driven gear and drive it responsive to movements of the vehicle, a pivoted frame upon which the cam shaft is mounted, means to move the frame about its pivot to engage and disengage the driving and the driven gears and to establish and disestablish an operative connection between the cam and the fare registering mechanism, and cam means coacting between the pivoted frame and the cam shaft to rotate the cam shaft to a predetermined starting position each time the driving and driven gears are disconnected.

6. In a taxicab meter, fare registering mechanism, a cam for actuating the fare registering mechanism intermittently, a cam shaft, a driven gear mounted on the cam shaft, a ratchet and pawl connection between the driven gear and the cam shaft to provide relative movement between the cam shaft and driven gear in one direction, a second driven gear mounted on the cam shaft, a ratchet and pawl connection between said gear and the shaft similar to the first mentioned ratchet and pawl connection, a second driving gear for said second mentioned driven gear, a chronometric device for actuating said second driving gear, a pivoted frame upon which the cam shaft is mounted, means to move the frame about its pivot to engage the driving and driven gears and to establish and disestablish an operative connection between the cam and the fare registering mechanism, and cam means coacting between the pivoted frame and the cam shaft to rotate the cam shaft to a predetermined starting position each time the driving and driven gears are disconnected.

7. In a taxicab meter, fare registering mechanism, a cam for actuating the fare registering mechanism intermittently, a cam shaft, a driven gear mounted on the cam shaft, a ratchet and pawl connection between the driven gear and the cam shaft to provide relative movement between the cam shaft and driven gear in one direction, a second driven gear mounted on the cam shaft, a ratchet and pawl connection between said gear and the shaft similar to the first mentioned ratchet and pawl connection, a second driving gear for said second mentioned driven gear, a chronometric device for actuating said second driving gear, a pivoted frame upon which the cam shaft is mounted, means to move the frame about its pivot to engage the driving and driven gears and to establish and disestablish an operative connection between the cam and the fare registering mechanism, cam means coacting between the pivoted frame and the cam shaft to rotate the cam shaft to a predetermined starting position each time the driving and driven gears are disconnected, means to register the times the pivoted frame is raised and lowered, and other means to register the number of times the fare registering mechanism is actuated.

8. In a taxicab meter, fare registering mechanism, a cam member for operating the fare registering mechanism and comprising a cylindrical member having a spiral peripheral groove therein terminating at a plurality of lobes, a cam shaft, a driven gear mounted on the cam shaft, a driving gear adapted to mesh with the driven gear, a pivoted frame upon which the cam shaft is mounted, a ratchet arm pivoted to swing in planes parallel to and transversely of the frame and extending transversely over a part of the frame, a finger carried by the ratchet arm for engaging the cam member, a pawl carried by the ratchet arm, an operating ratchet wheel on the fare registering mechanism which the pawl is adapted to engage, means to raise and lower the frame to disengage and engage the driving and driven gears, cam means cooperating between the frame and the ratchet arm when the frame is raised to move the ratchet arm laterally to a predetermined starting position and to disengage it from the cam member and the operating ratchet wheel, other cam means cooperating between the cam shaft and the pivoted frame to rotate the cam member to a predetermined starting position, whereby when the frame is lowered to engage the driving and the driven gears, the ratchet arm is lowered and its finger is brought into engagement with the cam member at the starting point of the spiral groove, providing for a predetermined rotary movement of the cam shaft before the finger engages the lobes of the cam member.

9. Apparatus as defined in claim 8 together with spring means to return the fare registering mechanism to a predetermined starting position when the ratchet arm is disengaged.

10. In mechanism of the character described, a fare registering mechanism, a pivoted pawl carrying arm and ratchet for operating the fare registering mechanism, a cam member disposed adjacent the pawl carrying arm and having a cylindrical portion with a spiral groove therein terminating in a plurality of lobes, a blade on the pawl carrying arm adapted to engage in the spiral groove and with the multiple lobed cam to actuate the ratchet, a flag shaft, and cam means on the flag shaft operatively connected to the pawl carrying arm to engage and disengage it from the multiple lobed cam.

11. In mechanism of the character described, a main actuating cam having a cylindrical body portion with a spiral groove therein and terminating in a plurality of lobes, a fare registering mechanism, a pawl carrying arm and ratchet for operating the fare registering mechanism, a member on the pawl carrying arm adapted to engage in the spiral groove and with the lobes of the cam to actuate the ratchet, a flag shaft, cam means on the flag shaft operatively connected to the pawl carrying arm to engage and disengage it from the multiple lobed cam, other cam means on the flag shaft for releasing the fare registering mechanism when the ratchet arm is disengaged from the main actuating cam, and spring means included in the fare registering mechanism for returning it to a predetermined initial position when the ratchet arm is disengaged.

THURMAN HORN.

REFERENCES CITED

The following references are of record in the file of this patent:

UNITED STATES PATENTS

| Number | Name | Date |
| --- | --- | --- |
| 584,216 | French | June 8, 1897 |
| 1,762,862 | Gluck | June 10, 1930 |